United States Patent
Weisser et al.

(10) Patent No.: US 7,583,876 B2
(45) Date of Patent: Sep. 1, 2009

(54) ILLUMINABLE IMAGE-CONDUCTING OPTICAL ASSEMBLY INCLUDING LIGHT-CONDUCTIVE OPTICS HOUSING FOR CREATING AN ILLUMINATING HALO

(75) Inventors: Michael Weisser, Tokyo (JP); Martin Freundt, Aachen (DE)

(73) Assignee: Schott Corporation, Elmsford, NY (US)

( * ) Notice: Subject to any disclaimer, the term of this patent is extended or adjusted under 35 U.S.C. 154(b) by 0 days.

(21) Appl. No.: 11/801,259

(22) Filed: May 9, 2007

(65) Prior Publication Data
US 2008/0044146 A1  Feb. 21, 2008

Related U.S. Application Data

(60) Provisional application No. 60/817,825, filed on Jun. 30, 2006.

(51) Int. Cl.
G02B 6/06 (2006.01)
(52) U.S. Cl. ......................... 385/116; 385/119
(58) Field of Classification Search ................. 385/116, 385/119
See application file for complete search history.

(56) References Cited

U.S. PATENT DOCUMENTS

| | | | | |
|---|---|---|---|---|
| 3,801,181 A | * | 4/1974 | Kitano et al. ................. | 359/652 |
| 4,732,448 A | * | 3/1988 | Goldenberg .................. | 385/33 |
| 4,784,144 A | * | 11/1988 | Ono et al. .................... | 600/325 |
| 4,790,295 A | * | 12/1988 | Tashiro ......................... | 600/176 |
| 4,854,302 A | * | 8/1989 | Allred, III .................... | 600/109 |
| 5,951,543 A | * | 9/1999 | Brauer .......................... | 606/10 |
| 6,178,346 B1 | * | 1/2001 | Amundson et al. ........... | 600/473 |
| 6,547,721 B1 | * | 4/2003 | Higuma et al. ................ | 600/133 |
| 2002/0007111 A1 | * | 1/2002 | Deckert et al. ............... | 600/177 |
| 2002/0021869 A1 | * | 2/2002 | Griffin .......................... | 385/43 |
| 2007/0280612 A1 | * | 12/2007 | Treado et al. ................ | 385/115 |

* cited by examiner

*Primary Examiner*—K. Cyrus Kianni
(74) *Attorney, Agent, or Firm*—Louis J. Franco; Law Office of Louis J. Franco

(57) ABSTRACT

An illuminable image-conducting optical assembly includes an illuminable image-transporting optical fiber bundle having (i) an inner image-conducting bundle with opposed image-input and image-output faces and (ii) a plurality of illumination conduits disposed peripherally about the image-conducting bundle. The illumination conduits include light-emission ends that combine to define a light-output face. A translucent optics housing includes light-entrance and light-exit ends and an inside surface defining an optics channel for housing at least one optical element. The optical fiber bundle and the optics housing cooperatively couple such that (a) at least one housed optical element is in optical communication with the image-input face in order to facilitate the projection of an image of an object of interest onto the image-input face and (b) the light-output face of the fiber bundle is in optical communication with the light-entrance end of the optics housing such that light introduced into the light-collection end of an illumination conduit enters the light-entrance end, and emits from the light-exit end, of the optics housing so as to facilitate illumination of the object to be imaged onto the image-input face.

5 Claims, 5 Drawing Sheets

*(Background)*

*(Background)*

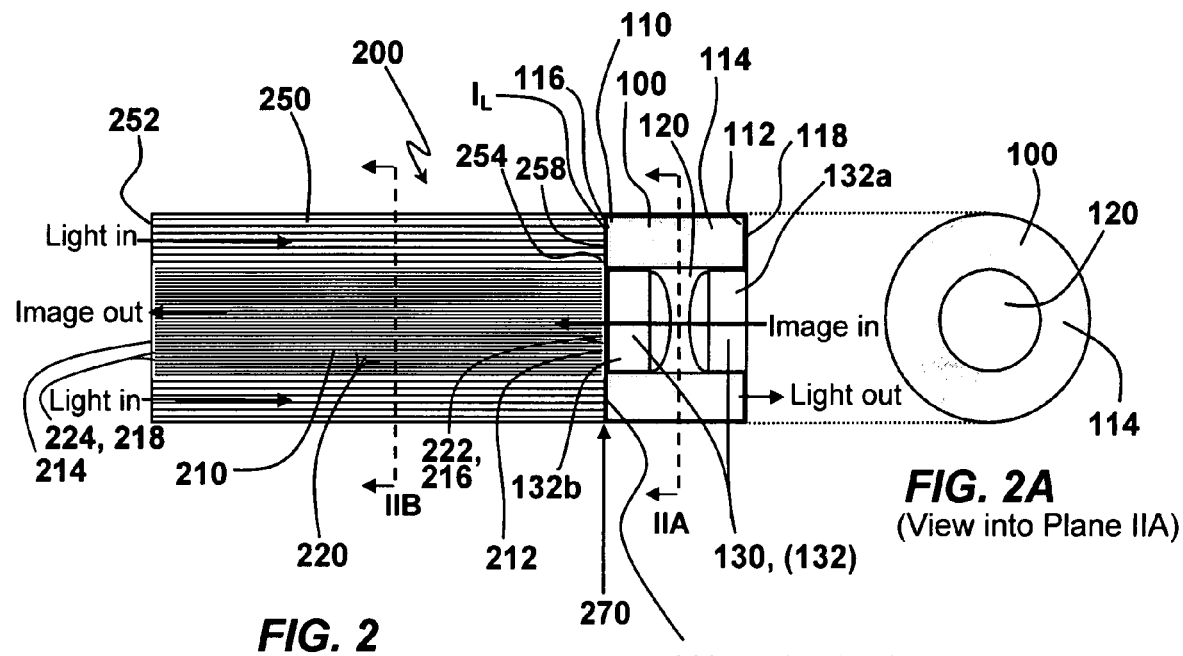
FIG. 2
FIG. 2A (View into Plane IIA)
110 retained to bundle 200 by, for example, optical epoxy $E_O$
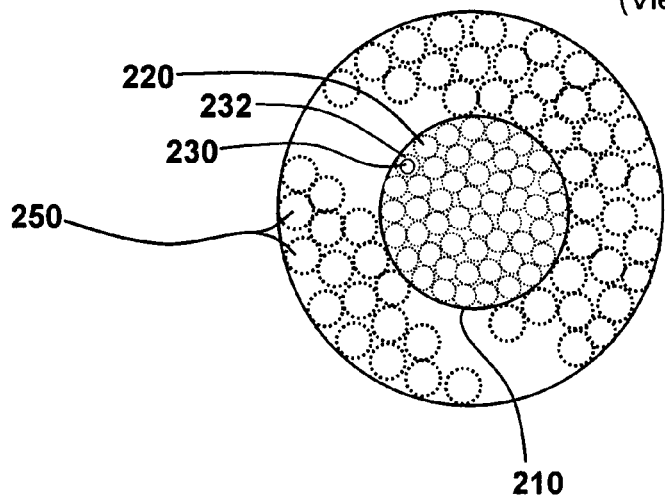
FIG. 2B (View into Plane IIB)

(View into Plane IIIA)

ILLUMINABLE IMAGE-CONDUCTING OPTICAL ASSEMBLY INCLUDING LIGHT-CONDUCTIVE OPTICS HOUSING FOR CREATING AN ILLUMINATING HALO

PROVISIONAL PRIORITY CLAIM

Priority based on Provisional Application, Ser. No. 60/817,825 filed Jun. 30, 2006, and entitled "LIGHT-CONDUCTIVE OPTICS HOUSING FOR CREATING AN ILLUMINATING HALO ADJACENT AN END OF AN OPTICAL FIBER IMAGE BUNDLE" is claimed. The entirety of the disclosure of the previous provisional application, including the drawings, is incorporated herein by reference as if set forth fully in the present application.

BACKGROUND

Known in the optical-fiber component fabrication field is an optical fiber bundle that includes a first set of imaging fibers bundled with a second set of illuminating fibers arranged, for example, circumferentially or, more generally, peripherally, about the imaging fibers as viewed into a plane orthogonal to a longitudinal axis of the imaging and illuminating fibers. Also known to those in the optical fiber industry is that the purpose of such bundles is to form an illuminating "halo" in the vicinity of an object for which an image is to be acquired by, and transported through, the bundled imaging fibers to a remote sensing location. An example of such a "halo" fiber bundle is schematically represented in FIG. 1A. Typically, a device such as that shown in FIG. 1A is assembled from inner and outward fiber bundles, wherein the outward bundle is comprised of illuminating fibers that transport light from a remote source or sources to the light-output end of the outer bundle and the inner bundle is comprised of imaging fibers having an image-input end arranged proximate to focusing optics (e.g., a lens doublet). In order to accommodate and house focusing optics, arrangements such as that of FIG. 1B are fabricated. In the bundle of FIG. 1B, the light-output end of the outer, illuminating bundle extends beyond the image-input end of the inner, imaging bundle in order to define a void or channel for the mounting of the focusing optics. Where, for instance, the inner and outer bundles are cylindrical, a cylindrical void is defined, and analogously for various cross-sectional bundle geometries.

Difficulties abound in the fabrication of illuminable image-transporting fiber bundles of the general configuration shown in FIG. 1B. A first, typical method fabrication involves the separate fabrication of the inner and outer bundles and then the introduction of the inner bundle into the outer bundle. A second method involves the fabrication of the inner bundle and then the assembly and securement of outer-bundle fibers about the inner bundle. In either event, the frequently small and fragile structures require handling by very skilled operators and/or very sophisticated automation equipment, either of which adds to the expense of fabrication. Moreover, the tolerances that are necessary for assembly, particularly those associated with the first method, are difficult to maintain and often reduce the usable surface(s) of the component. Still further, at least the end face of the inner bundle must be finished (e.g., ground and polished) before the outer bundle is arranged about the inner bundle, which increases the exposure of the finished inner face to the potential for damage during subsequent steps in the fabrication process. In still additional, alternative aspects, end portions of mutually fused imaging fibers are machined away to form an image-input face that is recessed with respect to a peripheral light-emission face in order to form a void or channel into which, for example, one or more optical elements (e.g., a lens) is mounted for focusing an image onto the image-input face. In a typical version consistent with the current state of the art, the optics mounted into the void or channel adjacent the image-input face are permanently mounted and, therefore, non changeable. It will be appreciated that machining for the purposes creating a channel to house optics subjects the fused image bundle to damage such as the shattering or splintering of constituent fibers that, as one will readily appreciate, results in the degradation of image input and transport through the image bundle. Moreover, polishing the recessed image-input face is difficult and may result in damage to surrounding illumination fibers.

Accordingly, there exists a need for a simplified assembly including an illuminable image-transporting optical fiber bundle and optics for focusing images into the image-input face thereof. Moreover, there is a need for versions of such an assembly capable of retaining in optical communication with the image-input face, alternative sets of optics.

SUMMARY

In accordance with a first illustrative set of embodiments, an illuminable image-conducting optical assembly includes an illuminable image-transporting optical fiber bundle (also referred to as "illuminable image bundle") and optics housing configured for cooperative coupling with the illuminable image bundle. The illuminable image bundle has an inner image-conducting bundle including first and second image-bundle ends and a plurality of light-conductive imaging conduits extending between the first and second ends. Each imaging conduit includes first and second ends and has the capacity to conduct light between its first and second ends by total internal reflection. The first ends of the imaging conduits terminate at and define an image-input face at the first image-bundle end and the second ends of the imaging conduits terminate at and define an image-output face at the second image-bundle end.

Peripherally disposed about the image-conducting bundle is a plurality of illumination conduits. Each illumination conduit includes a light-collection end and a light-emission end opposite the light-collection end. As with the imaging conduits, the illumination conduits are capable of transmitting light between the light-collection and light-emission ends by total internal reflection. In a typical embodiment, plural light-emission ends combine to define a light-output face. Moreover, the light-output face is typically more proximate the image-input face than the image-output face of the image-conducting bundle.

The optics housing extends between first and second housing ends and includes a housing wall that is fabricated, at least partially, from a translucent material. For purposes of the current specification, and the appended claims, "translucent" means "not entirely or completely opaque." Accordingly, "translucent" as defined herein covers the range from totally transparent to nearly, but not totally, opaque. The housing wall includes opposed light-entrance and light-exit ends and inside and outside surfaces extending between the light-entrance and light-exit ends. Moreover, the inside surface of the housing wall defines an interior optics channel. The optics channel is configured for housing an optical element set that includes at least one optical element such as, by way of non-limiting example, a focusing element such as a lens or graded-refractive-index element, an optical filter, an optical isolating element such as baffle, and a reflective element such as mirror or mirrored surface.

In an operative mode, the optics housing is cooperatively coupled with the illuminable image-transporting optical fiber bundle such that (i) at least one of the at least one optical elements housed by the optics housing is in optical communication with the image-input face of the image-conducting bundle in order to facilitate the projection of an image of an object of interest that is external to the optics channel onto the image-input face; and (ii) the light-output face defined by the plural light-emission ends is in optical communication with the light-entrance end of the optics housing such that light introduced into the light-collection end of an illumination conduit enters the light-entrance end of the housing wall for transmission to, and emission from, the light-exit end of the housing wall so as to facilitate illumination of the object to be imaged onto the image-input face.

Envisioned within the scope and contemplation of various versions as defined in the appended claims are kits wherein at least one of (i) the illuminable image-transporting optical fiber bundle and the optics housing are configured for selective cooperative coupling such that the optics housing is capable of alternative removal from and attachment to the illuminable image-transporting optical fiber bundle and (ii) the optics housing and optical element set are configured such that the optical element set is selectively retainable within and removable from the optics channel. Various such kits include at least one of (i) a set of optics housings including at least two optics housings and (ii) set of at least two optical element sets. In the first instance, optics housings may be alternatively attached to the illuminable image-transporting optical fiber bundle, while, in the second instance, plural optical elements sets may be alternatively retained within the optics channel. While either option increases the versatility of the assembly kit, versions in which both the optics housing and the optical element sets can be changed render possible the selective assembly of a greater number of cooperatively-coupled component combinations than is possible with either option alone.

Among the advantages of various versions providing for the coupling of an optics housing, such as that described above, with an illuminable image bundle are (i) obviation of difficult and expensive techniques such as cutting away portions of imaging fibers to create a void for the mounting of optics; (ii) facilitation of the "mixing" of illuminating light entering the housing from discrete illumination fibers; and (iii) interchangeability of housings and associated optics or of optical element sets within the housing, although the first two advantages are realizable in versions in which both or either of the optics housing and the optical element set are permanently affixed.

Representative, non-limiting embodiments are more completely described and depicted in the following detailed description and the accompanying drawings.

BRIEF DESCRIPTION OF THE DRAWINGS

FIG. 2 depicts an illuminable image-conducting optical assembly embodying aspects of the present invention and including a light-conductive optics housing having a translucent housing wall defining an optics channel that houses an optical element set and an illuminable image bundle that is cooperatively coupled with the optics housing;

FIG. 2A is a cross-sectional view into the plane IIA of FIG. 2;

FIG. 2B is a cross-sectional view into the plane IIB of FIG. 2;

DETAILED DESCRIPTION

Figure 1A:
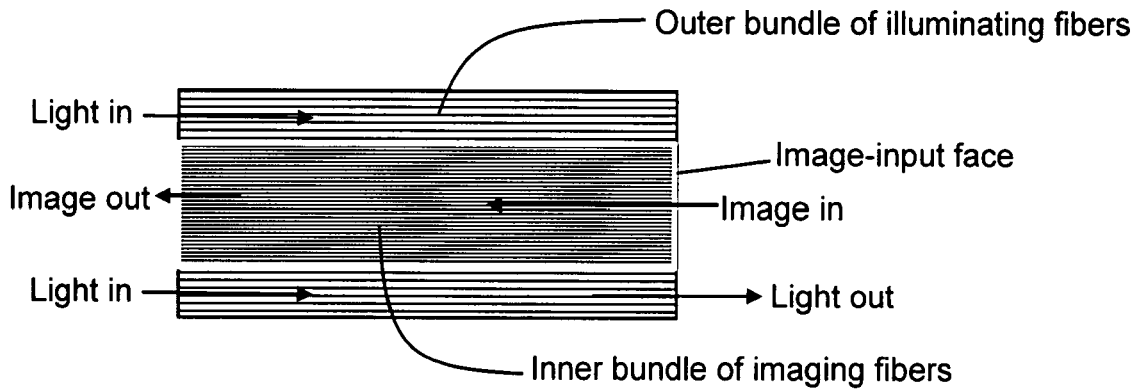
FIG. 1A shows a traditional illuminable image-transporting fiber bundle in which an inner bundle of adjacently-fused image-conducting optical fibers, or imaging fibers, is peripherally surrounded by a plurality of illuminating fiber.
Figure 1B:
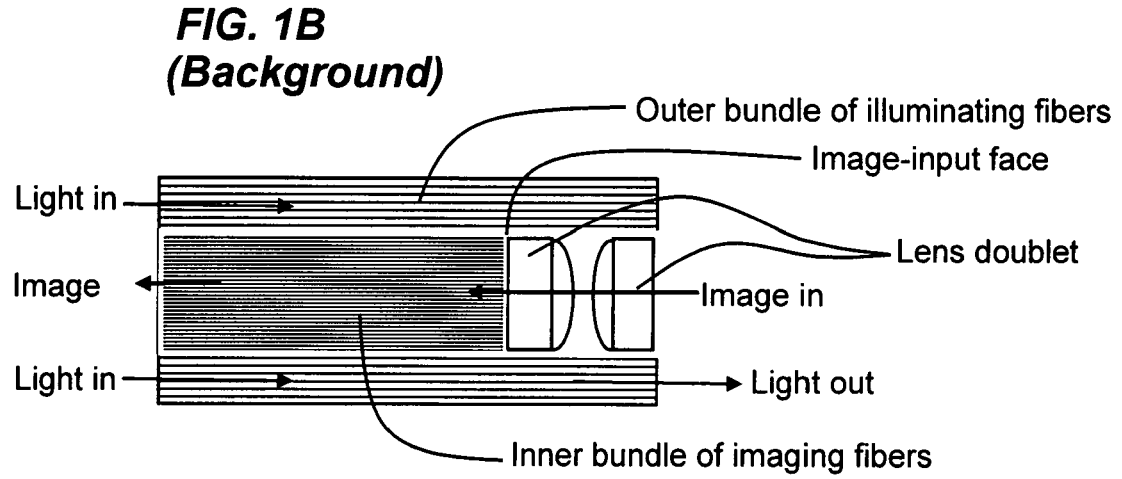
FIG. 1B depicts a an illuminable image-transporting fiber bundle in which an image-input face defined at one end of the inner image-conducting bundle is recessed with respect to a peripheral light-emission face defined collectively by the light-emission ends of plural illuminating fibers in order to form a void or channel into which one or more optical elements (e.g., a lens) is mounted for focusing an image onto the image-input face.

The following description of various embodiments of a light-conductive optics housing optically coupled with an illuminable image-transporting optical fiber bundle is illustrative in nature and is therefore not intended to limit the scope of the invention or its application of uses. Accordingly, the various implementations, aspects, versions and embodiments described in the summary and detailed description are in the nature of non-limiting examples falling within the scope of the appended claims and do not serve to define the maximum scope of the claims.

In a first illustrative configuration shown in FIGS. 2, 2A and 2B, a cylindrical light-conductive optics housing 100 extends between open first and second housing ends 110 and 112. A housing wall 114 extends between the first and second housing ends 110 and 112 and includes a light-entrance end 116 and a light-exit end 118 that coincide with, respectively, the first and second housing ends 110 and 112. Moreover, the housing wall 114 includes inside and outside surfaces 115a and 115b extending between the light-entrance and light-exit ends 116 and 118. The housing wall 114 defines an optics channel 120 that is bounded by the inside surface 115a and configured to house an optical element set 130 including at least one optical element. In the illustrative embodiment of FIG. 2, the optical element set 130 comprises a lens doublet 132 including first and second lenses 132a and 132b. However, it is to be understood that the optical element set 130 in various versions may include in addition to, or instead of, either or both of first and second lenses 132a and 132b, at least one of (i) an additional lens, (ii) a graded-refractive index focusing element, (iii) a dispersive element such as a prism, grating or grism, and (iii) an optical filter, by way of non-limiting example. At least a portion of the housing wall 114 is translucent such that light introduced into the housing wall 114 through the light-entrance end 116 is transmitted through the housing wall 114 for emission from the light-exit end 118.

Referring still to FIG. 2, the optics housing 100, and the optical element set 130 housed thereby, are in optical communication (i.e., optically coupled) with an illuminable image-transporting optical fiber bundle 200 which, for convenience and brevity, is alternatively referred to as illuminable image bundle 200 or by some similar designation. The illuminable image bundle 200 includes an inner image-conducting bundle 210 having first and second image-bundle ends 212 and 214 and a plurality of light-conductive imaging conduits 220 (e.g., optical fibers) extending between the first and second image-bundle ends 212 and 214. Referring to FIGS. 2 and 2B, each imaging conduit 220 includes first and second ends 222 and 224 and comprises an optically transmissive core 230 having an imaging-core refractive index. Each core 230 is surrounded by a cladding material 232 having an imaging-cladding refractive index lower than the imaging-core refractive index such that light propagates through the imaging conduit 220 by total internal reflection in accordance with principles well-known to those of ordinary skill in the related art. The first ends 222 of the imaging conduits 220 terminate at, and combine to define, an image-input face 216 at the first image-bundle end 212. Analogously, the second ends 224 of the imaging conduits 220 terminate at, and define, an image-output face 218 at the second image-bundle end 214.

Disposed circumferentially about the image-conducting bundle 210 is a plurality of bundled illumination conduits 250 (e.g., optical fibers). Each illumination conduit 250 includes a first, light-collection end 252 and a second, light-emission end 254 opposite the light-collection end 252. In alternative versions, the light-collection ends 252 of the illumination conduits 250 collect light from a single remote light source (not shown) or from multiple remote light sources (not shown). Plural light-emission ends 254 combine to define a light-output face 258. In the particular illuminable image bundle 200 of FIG. 2, the light-output face 258 is annularly disposed about the first ends 222 of the imaging conduits 220 such that the light-output face 258 and the image-input face 216 form a first common face 270. Moreover, in the particular version of FIG. 2, the first common face 270 is planar, but, in various versions within the scope and contemplation of the invention, is alternatively configured. Furthermore, in alternative versions, the optical coupling is retained permanently, such as by the application of an adhesive (e.g., optical epoxy $E_O$) to and between the light-output face 258 of the illuminable image bundle 200 and the light-entrance end 116 of the optics housing 100.

Figure 3:
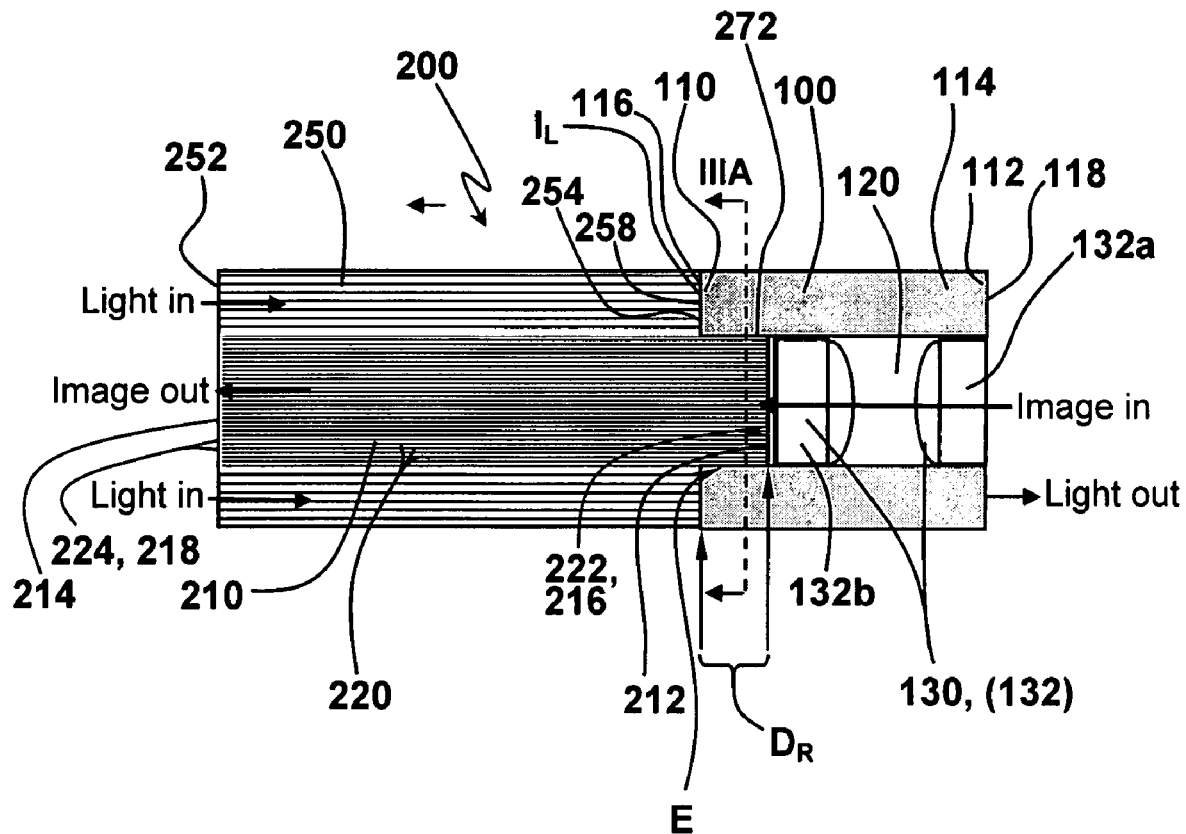
FIG. 3 shows an optical assembly, alternative to that of FIG. 2, in which the image-input face of the inner image-conducting bundle extends beyond the light-output face defined by the light-emission ends of the illumination conduits so as to define a stepped shoulder about which a portion of the optics housing is peripherally disposed and mounted.
Figure 3A:
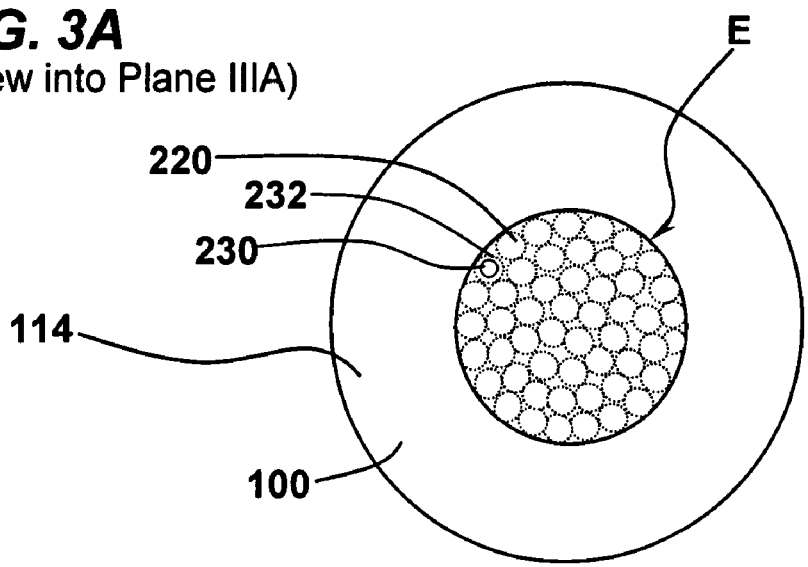
FIG. 3A is a cross-sectional view into the plane IIIA of FIG. 3.

Depicted in FIGS. 3 and 3A is an embodiment alternative to that of FIGS. 2, 2A and 2B. In most of its aspects, the version of FIGS. 3 and 3A includes elements analogous to those of the version of FIGS. 2-2B and, therefore, the same reference characters are used to identify like elements associated with the two alternative versions. In the version of FIGS. 3 and 3A, the image-input face 216 of the image-conducting bundle 210 does not define with the light-output face 258 a common face, such as common face 270 shown in FIG. 2. More specifically, while in the version of FIGS. 3 and 3A the light-emission ends 254 of the illumination conduits 250 define a light-output face 258 that is annularly disposed about the image-conducting bundle 210, the light-output face 258 is recessed by a distance DR relative to the image-input face 216 such that a stepped shoulder 272 separates the image-input face 216 and the light-output face 258. As shown in FIG. 3, a configuration in which the image-input face 216 extends beyond the light-output face 258 facilitates the protrusion of a portion of the length of the image-conducting bundle 210 into the optics channel 120 of a compatibly dimensioned optics housing 100. Shown in FIG. 3A is a view into cross-sectional plane IIIA of FIG. 3, which is taken along a portion of the image-conducting bundle 210 that protrudes into the optic channel 120 and shows that, along this protruding portion, the image-conducting bundle 210 is surrounded by the optics housing 100. In a version such as that of FIG. 3, an adhesive such as epoxy E, for example, may be applied to a portion of the stepped shoulder 272 extending along overlapping portions of the lengths of the image-conducting bundle 210 and the optics housing 100 to retain the optics housing 100 in a fixed position relative to the illuminable image bundle 200. In addition to contributing to overall structural integrity of the joint between the optics housing 100 and the illuminable image bundle 200, stepped shoulder 272, by providing a length-wise extending portion along which to apply an adhesive, obviates the need to apply adhesive to the light-entrance end 116 of the housing wall 114 and the light-output face 258, thereby preserving the integrity of light transmission at the light interface $I_L$ defined between the light-entrance end 116 and the light-output face 258.

Figure 4A:
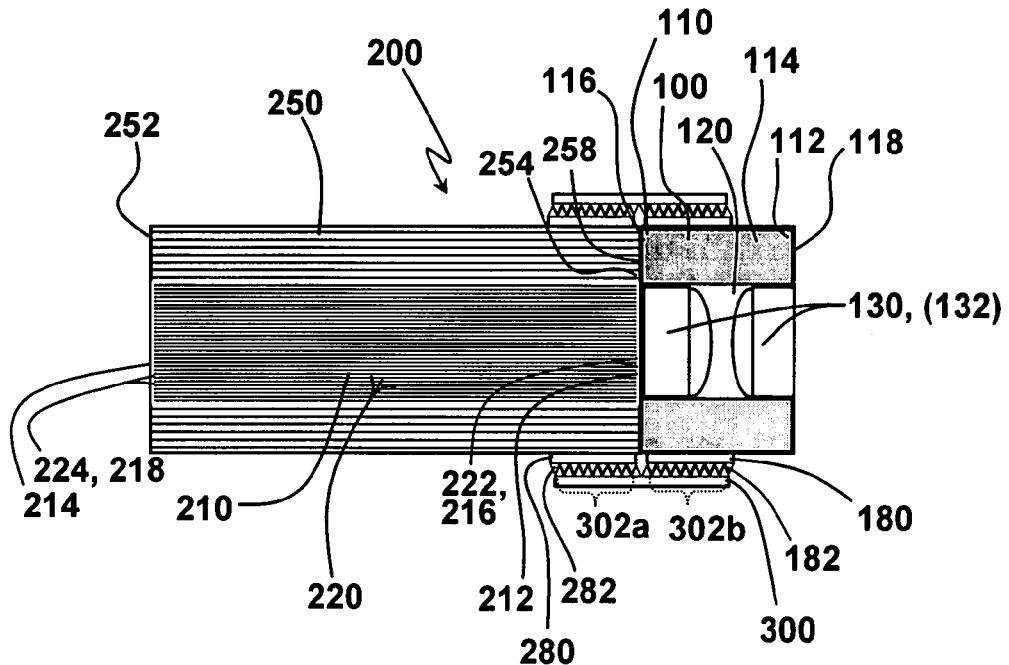
FIG. 4A depicts an illustrative embodiment in which the optics housing and the illuminable image bundle are configured for selective threadable coupling.
Figure 4B:
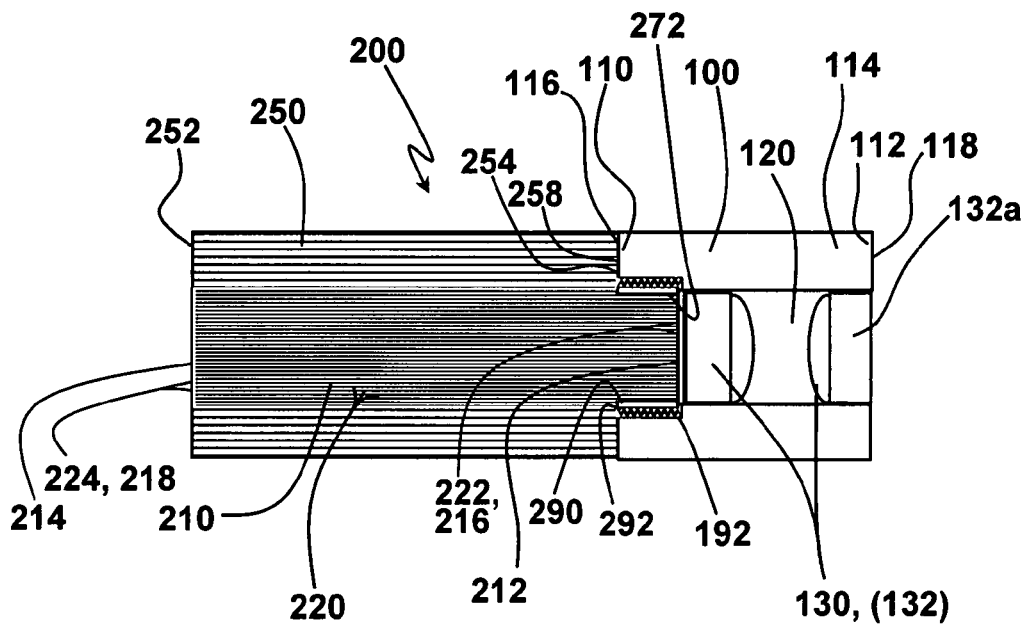
FIG. 4B depicts an embodiment, alternative to that of FIG. 4A, in which the optics housing and the illuminable image bundle are configured for selective threadable coupling.

Referring to FIGS. 4A and 4B, alternative versions are shown in which the optics housing 100 is threadably coupled to the illuminable image bundle 200. One advantage envisioned in association with such embodiments is the ability to selectively remove and attach different optics housings 100 retaining optical element sets 130 with different optical elements to the illuminable image bundle 200. The illustrative version of FIG. 4A is in most major respects similar to that of FIG. 2 and, therefore, like reference characters are used to refer to analogous elements. In the version of FIG. 4A, however, a portion of the length of the illuminable image bundle 200, beginning at the light output face 258, is provided with a first external-thread set 282. In the particular version depicted, the external-thread set 282 is formed on a first threaded collar 280 that is annularly affixed about a portion of the length of the illuminable image bundle 200. However, it will be appreciated that the illuminable image bundle 200 may be otherwise provided with an external-thread set 282. Similarly, a portion of the length of the optics housing 100, beginning at the light-entrance end 116, and extending toward the light-exit end 118, has affixed thereabout a second threaded collar 180 that carries a second external-thread set 182. The optics housing 100 and illuminable image bundle 200 are selectively coupled by an internally-threaded coupler 300 that has defined therein a first internal-thread set 302a into which threads of the first external-thread set 282 are threaded and a second internal-thread set 302b into which threads of the second external-thread set 182 are threaded. It is to be understood that alternative versions may include an internally-threaded coupler 300 that is permanently affixed (e.g. and not threaded) about one of the illuminable image bundle 200 and the optics housing 100, while the other of the optics housing 100 and the image bundle 200 is threaded into the threaded coupler 300.

Referring to FIG. 4B, a version including a stepped shoulder 272 such as that exhibited by the version of FIG. 3 is shown. To the extent that elements of the versions of FIGS. 4B and 3 are analogous, they are identified by like reference characters. Referring now to FIG. 4B, at least a portion of the stepped shoulder 272 extending along a portion of the length of the inner image-conducting bundle 210 carries inner-bundle external threads 292. In the particular version shown, the inner-bundle external threads 292 are defined about the exterior surface of a inner-bundle threaded collar 290 that is affixed about that portion of the inner bundle 210 protruding beyond the light-output face 258. However, it will be appreciated that the portion of the inner bundle 210 protruding beyond the light-output face 258 may be otherwise provided with inner-bundle external threads 292. Beginning adjacent the light-entrance end 116, a portion along the length of the optics housing 100 includes housing internal threads 192 configured for selective threading engagement with the inner-bundle external threads 292. In the particular version shown, the housing internal threads 192 are formed (e.g., cut or molded) in the material (e.g., glass or plastic) from which the optics housing 100 is fabricated, although the optics housing 100 may be otherwise provided with internal threads 192. For instance, a portion of the interior of the optics housing 100 may have affixed therein an internally threaded collar (not shown) along an interior surface of which the housing internal threads 192 are defined.

In still further illustrative embodiments in which the optics housing 100 is either permanently attached or selectively attachable to the illuminable image bundle 200, an optical element set 130 is selectively insertable into and out of the optics housing 100. Accordingly, for instance, in an embodiment in which the optics housing 100 is permanently attached to the illuminable image bundle 200, one set of optics can still be substituted for another in order to increase the overall versatility of the illuminable image bundle 200. An illustrative, non-limiting example of such an embodiment is shown in FIG. 5.

Figure 5:
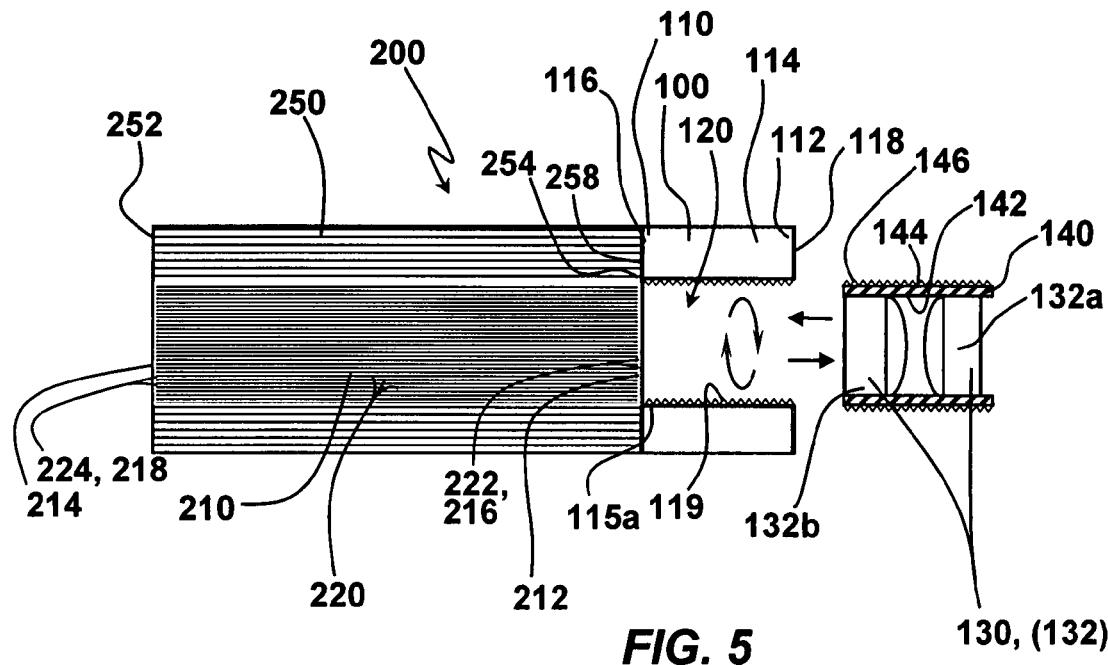
FIG. 5 shows an embodiment in which, irrespective of whether the optics housing is selectively separable from the illuminable image bundle, the optical element set is selectively retainable within the optics channel of the optics housing.

In the example of FIG. 5, an optical element set 130 comprising a lens doublet 132 including first and second lenses 132a and 132b is affixed within an optics casing 140. The optics casing 140 has interior and exterior surfaces 142 and 144 and exhibits external dimensions that render it configured for the selective introduction into, and retention within, the optics channel 120. In the version of FIG. 5, the exterior surface 144 of the optics casing 140 carries a set of external casing threads 146 configured for selective threading engagement with internal housing threads 119 depending from the inside surface 115a of the housing wall 114.

Figure 5A:
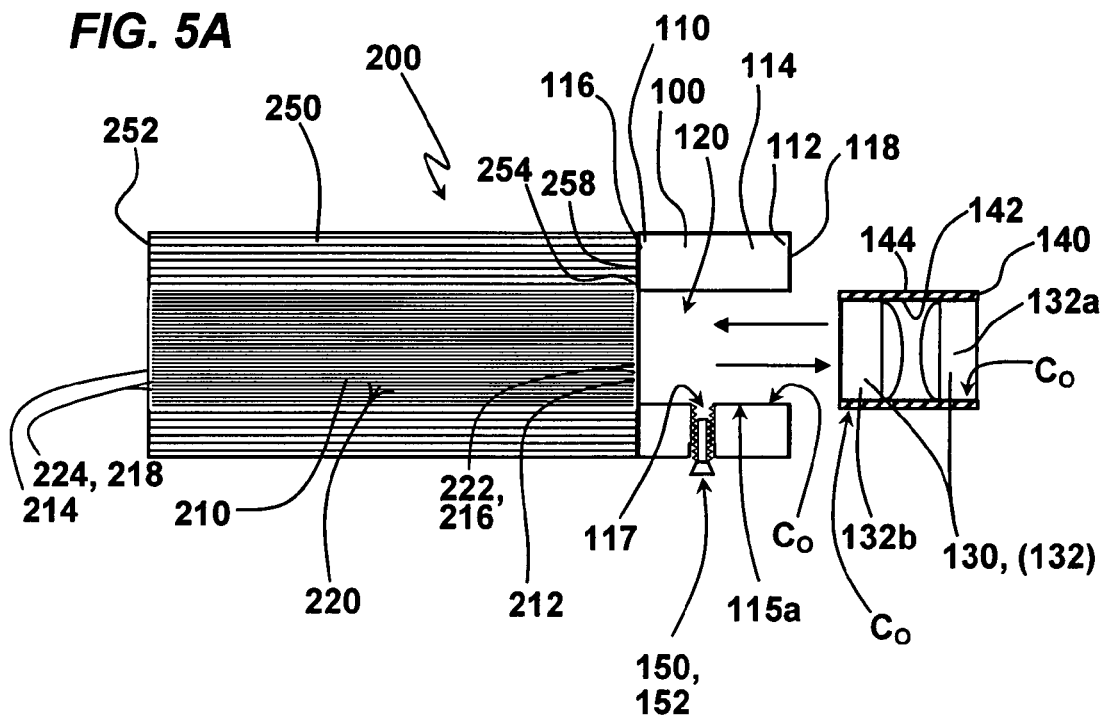
FIG. 5A illustrates another alternative version in which the optical element set is selectively retainable within the optics channel of the optics housing.

Depicted in FIG. 5A is another illustrative version in which an optical element set 130 is threadably retainable within the optics channel 120 of an optics housing 100. In the illustrative version of FIG. 5A, an optics casing 140 carrying a lens doublet 132 is slidably insertable into, and removable from, the optics channel 120 of the optics housing 100. An optical-set retainer 150 depending from the housing wall 114 is configured for selective retention of the optics casing 140. More specifically, in the case of FIG. 5A, a threaded bore 117 extending through the housing wall 114 threadably retains a set screw 152. With the optics casing 140 positioned as desired within the optics channel 120, the set screw 152 may be threaded into the threaded bore 117 so as to selectively exert a retaining force against the exterior surface 144 of the optics casing 140. Although the set screw 152 is not shown in a casing-retentive mode, the mode is readily comprehensible from the depiction of the FIG. 5A and associated description hereinabove.

Various alternative embodiments provide for the selective coupling of an optical element set 130 to the illuminable image bundle 200 by means of threads. It will be appreciated that threaded surfaces must be at least arcuate, and are typically entirely cylindrical. However, alternative embodiments within the scope and contemplation of the invention include at least one of (i) an illuminable image bundle 200, (ii) an optics housing, and (iii) an optics casing 140 that is other-than-cylindrical in cross-sectional geometry. In various such versions, at least one of the optics housing 100 and the optical element set 130 within the optics housing 100 may be selectively retained by set screws such as set screw 152 in FIG. 5A or devices other than threaded fasteners such, by way of non-limiting example, at least one of a (i) clip, (ii) snap and (iii) magnet.

In still additional versions, it may be desirable to at least partially optically isolate at least one optical element of the optical element set 130 from the translucent material from with the housing wall 114 of the optics housing 110 is fabricated. It will be appreciated that the aforesaid optical isolation may be achieved by the inclusion of one or more opaque layers. Referring to FIG. 5A, in one version, an opaque coating $C_O$ is applied to the inside surface 115a of the housing wall 114. Alternatively or in addition, an opaque coating is applied to at least one of the interior and exterior surfaces 142 and 144 of the optics casing 140 in those embodiments including and optics casing 140 such as, by way of example, the embodiment of FIG. 5A. In yet other alternative versions including an optics casing 140, the optics casing 140 is fabricated from an opaque material.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. An illuminable image-conducting optical assembly comprising:
   (a) an illuminable image-transporting optical fiber bundle having
      (i) an inner image-conducting bundle including first and second image-bundle ends and a plurality of light-conductive imaging conduits extending between the first and second ends, each imaging conduit including first and second ends and having the capacity to conduct light between the first and second ends by total internal reflection, the first ends of the imaging conduits terminating at and defining an image-input face at the first image-bundle end and the second ends of the imaging conduits terminating at and defining an image-output face at the second image-bundle end; and
      (ii) a plurality of illumination conduits disposed peripherally about the image-conducting bundle, each illumination conduit including a light-collection end and a light-emission end opposite the light-collection end, the plural light-emission ends combining to define a light-output face more proximate the image-input face than the image-output face of the image-conducting bundle;
   (b) an optics housing including a housing wall fabricated from a translucent material and having an outside surface and inside surface defining an interior optics channel configured for housing an optical element set, the optics housing extending between first and second housing ends and the housing wall including light-entrance and light-exit ends coinciding with, respectively, the first and second housing ends; and
   (c) an optical element set including at least one optical element housed within the optics channel of the optics housing; wherein
   the optics housing is cooperatively coupled with the illuminable image-transporting optical fiber bundle such that (i) at least one of the at least one optical elements housed by the optics housing is in optical communication with the image-input face of the image-conducting bundle in order to facilitate the projection of an image of an object of interest that is external to the optics channel onto the image-input face of the image-conducting bundle; and (ii) the light-output face defined by the plural light-emission ends is in optical communication with the light-entrance end of the optics housing such that light introduced into the light-collection end of an illumination conduit enters the light-entrance end of the housing wall for transmission to, and emission from, the light-exit end of the housing wall so as to facilitate illumination of the object to be imaged onto the image-input face.

2. The assembly of claim 1 wherein the illuminable image-transporting optical fiber bundle and the optics housing are configured for selective cooperative coupling such that the optics housing is capable of alternative removal from and attachment to the illuminable image-transporting optical fiber bundle.

3. The assembly of claim 2 wherein (i) a portion of the length of the illuminable image-transporting optical fiber bundle is provided with a first external-thread set;

(ii) a portion of the length of the optics housing carries a second external-thread set; and (iii) the optics housing and the illuminable image-transporting optical fiber bundle are selectively coupleable by an internally-threaded coupler that has defined therein a first internal-thread set into which threads of the first external-thread set are threadable and a second internal-thread set into which threads of the second external-thread set are threadable.

4. The assembly of claim 2 wherein the light-output face is peripherally disposed about the image-conducting bundle and recessed relative to the image-input face such that (a) a stepped shoulder extending along a portion of the length of the image-conducting bundle separates the image-input face and the light-output face and (b) when the optics housing and the illuminable image-transporting optical fiber bundle are cooperatively coupled, a portion of the length of the image-conducting bundle protrudes into the optics channel of the optics housing.

5. The assembly of claim 4 wherein (i) at least a portion of the stepped shoulder carries inner-bundle external threads; and (i) a portion along the length of the optics housing includes housing internal threads configured for selective threading engagement with the inner-bundle external threads.

* * * * *